(12) United States Patent
Shen

(10) Patent No.: US 8,689,638 B2
(45) Date of Patent: Apr. 8, 2014

(54) ULTRASONIC FLOW SENSOR

(75) Inventor: Chang Shen, Acton, MA (US)

(73) Assignee: Spire Metering Technology LLC, Acton, MA (US)

( * ) Notice: Subject to any disclaimer, the term of this patent is extended or adjusted under 35 U.S.C. 154(b) by 242 days.

(21) Appl. No.: 13/374,768

(22) Filed: Jan. 12, 2012

(65) Prior Publication Data

US 2013/0180342 A1 Jul. 18, 2013

(51) Int. Cl.
*G01F 1/66* (2006.01)
(52) U.S. Cl.
USPC ....................................... 73/861.25
(58) Field of Classification Search
USPC ............... 73/861.25, 861.24, 861.28
See application file for complete search history.

(56) References Cited

U.S. PATENT DOCUMENTS 4,049,954 A * 9/1977 Da Costa Vieira et al. ... 702/157
4,984,449 A * 1/1991 Caldwell et al. ............... 73/49.2

* cited by examiner

*Primary Examiner* — Jewel V Thompson

(57) ABSTRACT

An ultrasonic flow sensor comprises a flow cell body with an inlet on one side and an outlet on the other side through which the liquid or gaseous media flows; an inner flow conduit with rough surface which not only decreases the flow transition point from turbulence regime to laminar regime but also suppresses the parasitic multi-mode ultrasonic waves; one pair of electro-ultrasonic transducers for transmitting and receiving ultrasound signals; one pair of ultrasonic wave reflecting mirrors for guiding ultrasonic waves from one transducer to the other; and two reflecting mirror support fixtures which set the position and orientation of the ultrasonic wave reflecting mirrors in such a way that their disturbance to the flow inside the inner flow conduit is minimized while the ultrasonic signal strength is maintained.

25 Claims, 8 Drawing Sheets

A-A

B-B

ULTRASONIC FLOW SENSOR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF THE INVENTION

The present disclosure relates to an ultrasonic flow sensor for measuring the average velocity of liquid and gaseous media.

BACKGROUND OF THE INVENTION

The statements in this section merely provide background information related to the present disclosure and may not constitute prior art.

An ultrasonic flow sensor measures the average velocity of liquid or gaseous media by means of ultrasonic transducers based on the principle that the transit time of an ultrasonic wave from the transmitter of a transducer to the corresponding receiver is determined by the fluid velocity and the ultrasonic wave propagating direction. Normally, a pair of transducers is used, one is installed in upstream and the other is installed in downstream. Each transducer can be used as a transmitter or a receiver. One ultrasonic pulse is transmitted from the upstream transducer to the downstream transducer. The second ultrasonic pulse is transmitted from the downstream transducer to the upstream transducer. The transit time in each direction is accurately measured by an electronic console. The difference of the two transit-time data is proportional to flow velocity. It is then used to calculate the average flow velocity of the fluid.

The following three factors are most important criteria when customers select ultrasonic flow sensors for their applications: 1) measurement accuracy, 2) measurement reliability, and 3) the cost of ownership. Ultrasonic flow sensors with high measurement accuracy and reliability as well as low cost of ownership are the choice of the majority of customers.

The measurement accuracy and reliability of an ultrasonic flow sensor are mainly affected by: 1) the flow velocity of the fluid to be measured, 2) the uniformity of the velocity profile, 3) the signal strength of the measuring ultrasound wave, and 4) the parasitic multi-mode acoustic wave generated by the internal reflection.

In general the flow velocities, the uniformity of the velocity profile and the ultrasonic signal strength have positive impact on the measurement accuracy and reliability of an ultrasonic flow sensor. Higher flow velocity, lesser disturbance, better uniformity of the velocity profile and stronger ultrasound signal lead to higher measurement accuracy and reliability. On the other hand, the parasitic multi-mode ultrasonic wave generated by the internal reflection has negative impact on measurement accuracy and reliability. The stronger the parasitic multi-mode ultrasonic wave, the lower the measurement accuracy and reliability.

The cost of ownership of ultrasonic flow sensors depends on the initial product price and its life cycle. A competitive ultrasonic flow sensor must be easy to manufacture, easy to assemble, and have to maintain performance stability over its life cycle. This in turn requires that an ultrasonic flow sensor must be as simple as possible and have minimal number of components and/or parts.

BRIEF SUMMARY OF THE INVENTION

Further areas of applicability will become apparent from the description provided herein. It should be understood that the description and specific examples are intended for purposes of illustration only and are not intended to limit the scope of the present disclosure.

The object of the present invention is to provide an ultrasonic flow sensor which can accurately and reliably measure the average velocity of liquid and gaseous media as well as has low cost of ownership.

In more detail the present invention provides an ultrasonic flow sensor comprises a flow cell body with an inlet on one side and an outlet on the other side through which the liquid or gaseous media flows; an inner flow conduit with rough surface which not only decreases the flow transition point from turbulence regime to laminar regime but also suppresses the parasitic multi-mode ultrasonic waves; one pair of electro-ultrasonic transducers for transmitting and receiving ultrasound signals; one pair of ultrasonic wave reflecting mirrors for guiding ultrasonic waves from one transducer to the other; and two reflecting mirror support fixtures which set the position and orientation of the ultrasonic wave reflecting mirrors in such a way that their disturbance to the flow inside the inner flow conduit is minimized while the ultrasonic signal strength is maintained.

An ultrasonic flow sensor of the present invention differs from the prior art in the following aspects. 1) It provides a means of suppressing the parasitic multi-mode waves generated by the internal reflection to increase the measurement accuracy and reliability. 2) It employs a pair of ultrasound wave reflecting mirrors with flat or convex top surface rather than mirrors with concave surface to prevent particle deposition onto the mirror surface. 3) It uses hemispheres or hemi-elliptical spheres as the reflecting mirror holders to improve the flow velocity uniformity along the measuring path. 4) It provides a mechanism to set the reflecting mirrors to the position and orientation in such a way that their disturbance to the flow to be measured is minimized while the ultrasonic signal strength is maintained. 5) Its simple and unique structure makes it easy to assemble and easy to manufacture.

BRIEF DESCRIPTION OF THE SEVERAL VIEWS OF THE DRAWINGS

The drawings described herein are for illustration purposes only and are not intended to limit the scope of the present disclosure in any way.

DETAILED DESCRIPTION OF THE INVENTION

Figure 1:
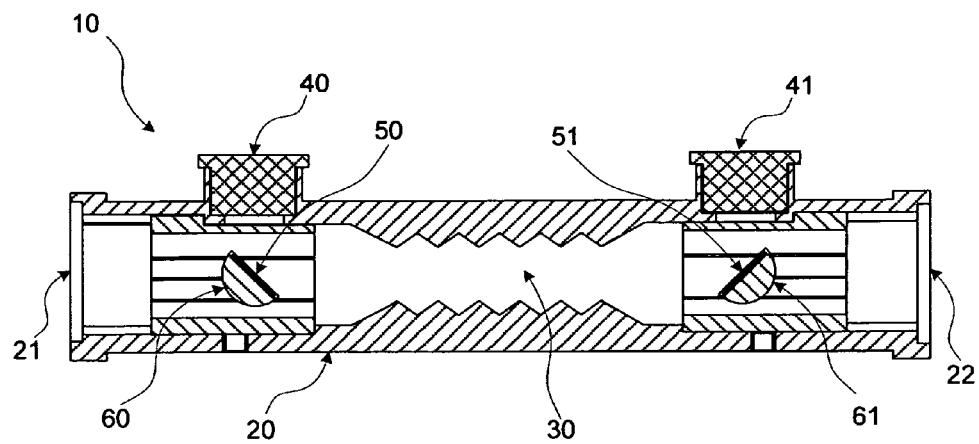
FIG. 1 shows a schematic cross-section view of an ultrasonic flow sensor of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, an ultrasonic flow sensor 10 consists of a flow cell body 20 with an inlet 21 on one side and an outlet 22 on the other side through which the liquid or gaseous media flows, an inner flow conduit 30 with a rough surface which not only decreases the flow transition point from turbulence regime to laminar regime but also suppresses the parasitic multi-mode ultrasonic waves, one pair of electro-ultrasonic transducers 40, 41 for transmitting and receiving ultrasound signals, one pair of ultrasonic wave reflecting mirrors 50, 51 for guiding the ultrasonic waves from one transducer to the other, and one pair of reflecting mirror support fixtures 60 and 61 which align the reflecting mirrors to the center line of the inner flow conduit. The reflecting mirror support fixtures 60, 61 also keep the distance between the reflecting mirrors 50, 51 and the entrance/exit of the inner flow conduit 30 in a range that the disturbance to the flow inside the inner flow conduit caused by the reflecting mirrors is minimized while the ultrasonic signal strength is maintained.

Figure 2A:
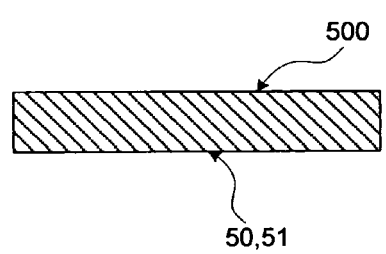
FIG. 2A shows an ultrasonic wave reflecting mirror with flat top surface of the present disclosure.
Figure 2B:
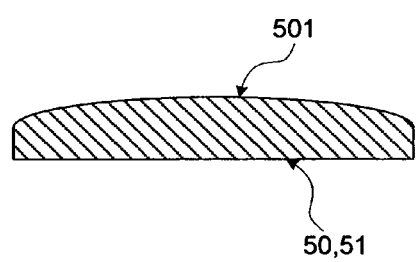
FIG. 2B shows an ultrasonic wave reflecting mirror with convex top surface of the present disclosure.

Referring to FIGS. 1, 2A, 2B, the ultrasonic wave reflecting mirrors 50, 51 are made of stainless steel, or plastics coated with thin metallic film layers.

Figure 2C:
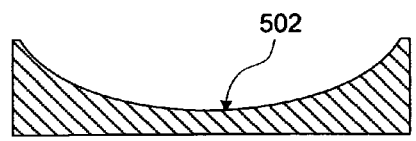
FIG. 2C shows an ultrasonic wave reflecting mirror with concave top surface of prior art.

Referring to FIGS. 2A, 2B and 2C, an ultrasonic wave reflecting mirrors 50, 51 have a flat top surface 500 or a convex top surface 501 instead of having a concave top surface 502. Compared with the concave top surface 502 used in prior art, both the flat top surface 500 and the convex top surface 501 have the advantage of preventing particle deposition onto the mirror surface and thus preventing the degradation of ultrasonic signal strength. In addition, reflecting mirrors 50, 51 with convex top surface generate smaller disturbance to the flow inside the inner flow conduit 30 compared with mirrors with concave top surface. To avoid significant ultrasound beam divergence caused by the curvature, the curvature of the ultrasonic wave reflecting mirrors 50, 51 is kept small enough.

Figure 3A:
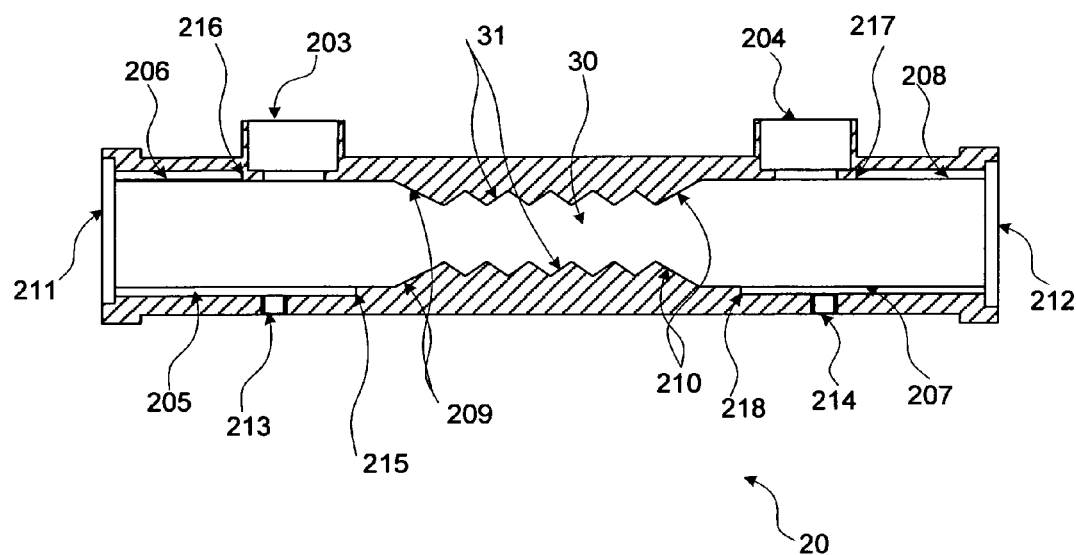
FIG. 3A shows a schematic cross-section view of a flow cell body of the present disclosure.
Figure 3B:
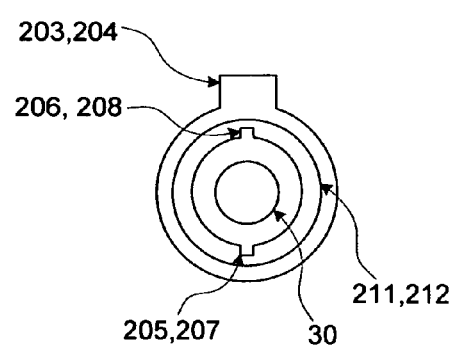
FIG. 3B shows a schematic side view of a flow cell body of the present disclosure.

Referring to FIGS. 1 and 3A, the flow cell body 30 is made of plastics or metallic material such as bronze. It comprises two housing ports 203, 204. Electro-ultrasonic transducers 40, 41 are positioned and acoustically coupled to the housing ports 203, 204 to measure the velocity of the fluid flowing from inlet 21 to outlet 22.

Referring to FIGS. 1, 3A, 3B, 6A and 6C, the flow cell body 30 comprises four keyways 205, 206, 207 and 208 with pre-defined depth. The reflecting mirror support fixtures 60 is located in keyways 205, 206, and the reflecting mirror support fixtures 61 is located in keyways 207, 208 respectively. When the guide keys 603, 604 (shown in FIGS. 6A, 6C) of the reflecting mirror supporting fixtures 60, 61 touched the bottom surfaces 215, 216, 217, 218 of the keyways 205, 206, 207 and 208, the distance between the reflecting mirror 50 and the entrance of the inner flow conduit 30, as well as the distance between the reflecting mirror 51 and the exit of the inner flow conduit 30, are set to the predefined values, and the reflecting mirrors 50, 51 reach their predefined positions. In the pre-defined positions the reflecting mirrors 50, 51 are aligned to the center line of the inner flow conduit 30. This center line of the inner flow conduit 30 is co-axial with the beam center of the ultrasonic wave transmitted and/or received by the electro-ultrasonic transducers 40, 41.

Once the reflecting mirror supporting fixtures 60, 61 reach their desired positions, they are locked to flow cell body 20 by a pair of set screws (not shown here) through the threaded holes 213, 214.

Referring to FIGS. 1 and 3A, an inner flow conduit 30 is formed as an integrated portion of the flow cell body 20. The diameter of the inner flow conduit 30 is smaller than the inner diameter of the flow cell body 20. This leads to higher flow speed and lower transition point from turbulence regime to laminar regime when the fluid flows through the inner flow conduit 30, both of them contribute to the improvement of measurement accuracy and reliability of the ultrasonic flow sensor of the present invention.

Referring to FIGS. 1, 3A, the inner surface 31 of the inner flow conduit 30 is intentionally machined with a rough finish to suppress the parasitic multi-mode ultrasonic waves. The roughness varies from several microns to several millimeters depending on the ultrasound wave length in the fluid and the diameter of the inner flow conduit 30.

Figure 4:
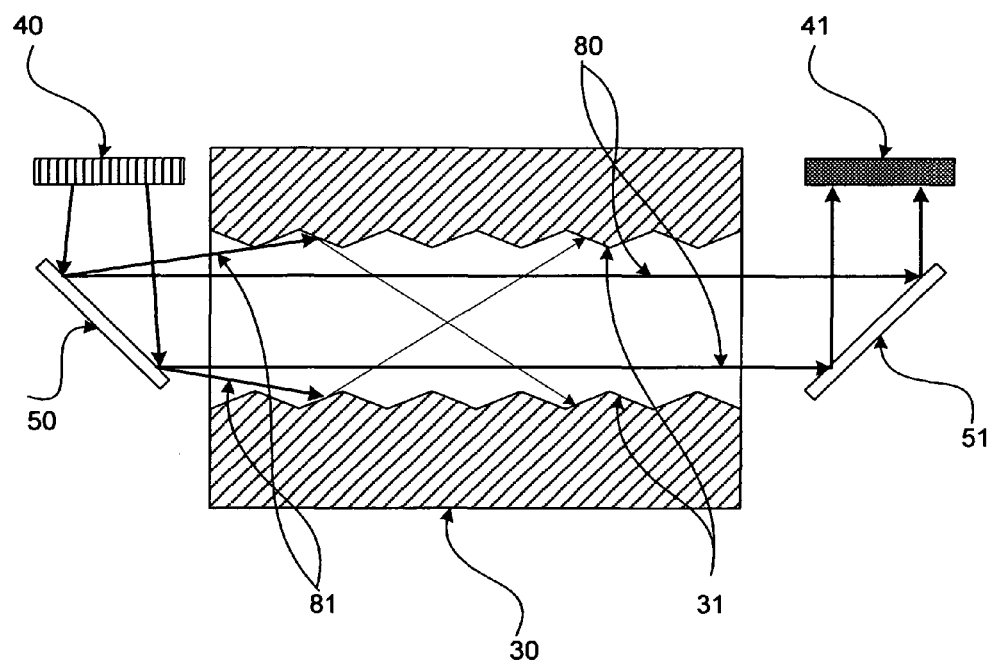
FIG. 4 illustrates ultrasonic wave propagation inside an inner flow conduit of the present disclosure.

Referring to FIG. 4, the ultrasonic wave transmitted from the electro-ultrasonic transducer 40 comprises two components: the main measuring beam 80 and the parasitic multi-mode diverging beam 81. The main measuring beam 80 passes through the inner flow conduit 30 without interfacing with the surface 31 of the inner flow conduit 30. After reflected by the reflecting mirror 51, it arrives at the receiver of the transducer 41.

Referring to FIG. 4, the parasitic multi-mode diverging beam 81 travels in a quite different path compared with that of the main measuring beam 80. It first hits the surface 31 at the entrance, and is reflected by the surface 31 several times inside the inner flow conduit 30. If the surface 31 is a smooth surface, the parasitic multi-mode diverging beam 81 will combine with the main measuring beam 80 after leaving the exit of the inner flow conduit 30, reflected by the reflecting mirror 51 and arrive at the receiver of the transducer 41, and finally appear in the electronic signal of the transducer 41. On the other hand, when the surface 31 is a rough surface with proper roughness, the parasitic multi-mode diverging beam 81 will be completely absorbed by the surface 31 after being reflected several times inside the inner flow conduit 30. It will never reach the reflecting mirror 51 and thus the receiver of the ultrasonic transducer 41. As a result, it will not appear in the electronic signal of the ultrasonic transducer 41.

Figure 5:
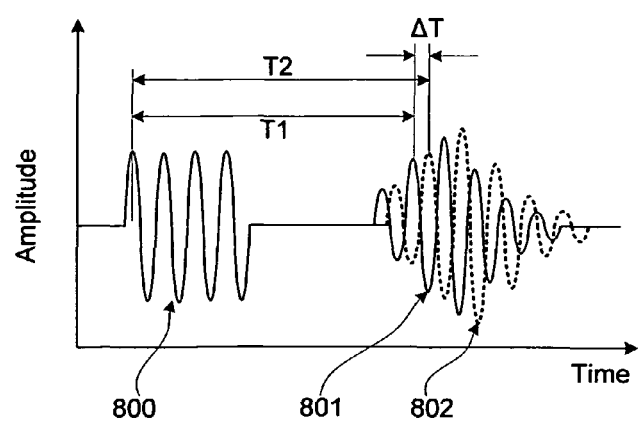
FIG. 5 illustrates the transmit time difference of ultrasonic signals with and without multi-mode parasitic waves.

The parasitic multi-mode diverging beam 81 is a harmful wave. It causes transmit time measurement error and hence decreases the velocity measurement accuracy. Referring to FIGS. 4, 5, signal 800 represents the ultrasonic wave transmitted from the transmitter of the ultrasonic transducer 40, signal 801 represents the main measuring beam 80 received by the receiver of the ultrasonic transducer 41, and signal 802 represents the composite ultrasonic wave of the main measuring beam 80 and the parasitic multi-mode diverging beam 81. In flow velocity measurement, the time T1 is the actual transmit time to be measured, however, in case that the parasitic multi-mode diverging beam 81 exists, T2 is the time detected by the ultrasonic transducer 41. The difference ΔT is the transmit time measurement error.

By intentionally preparing the surface 31 with proper roughness the present disclosure significantly eliminates the parasitic multi-mode ultrasonic waves, avoids the transmit time measurement error ΔT shown in FIG. 5 and thus greatly improves the measurement accuracy of an ultrasonic flow sensor of the present disclosure.

Figure 6A:
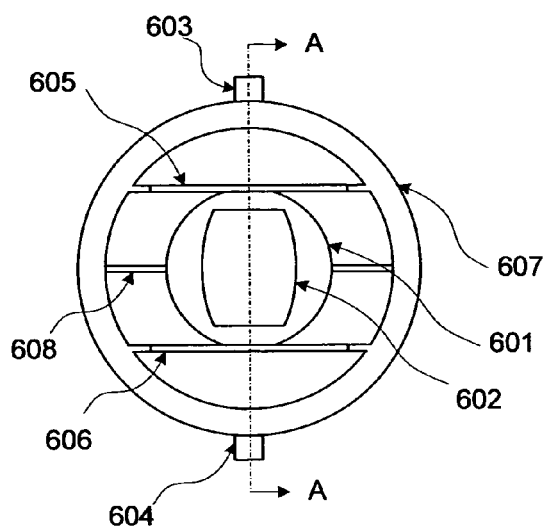
FIG. 6A shows a schematic front view of an ultrasonic wave reflecting mirror support fixture of the present disclosure.
Figure 6B:
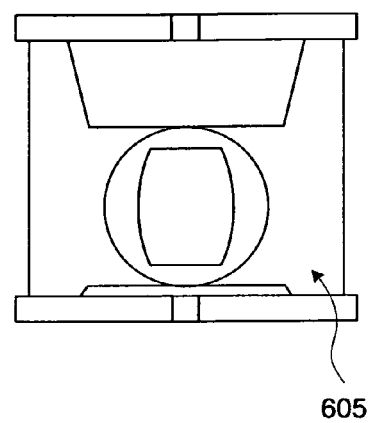
FIG. 6B shows a schematic top view of an ultrasonic wave reflecting mirror support fixture of the present disclosure.
Figure 6C:
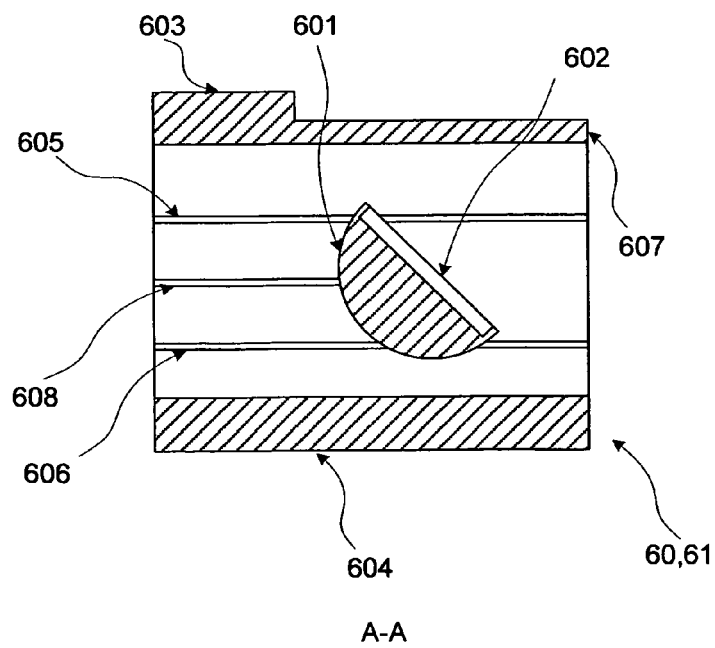
FIG. 6C shows a schematic cross-section view of an ultrasonic wave reflecting mirror support fixture of the present disclosure.

Referring to FIGS. 6A, 6B and 6C, a reflecting mirror support fixture 60 (61) is made of plastics and comprises a hemisphere (or a hemi-elliptical sphere) 601, a ultrasonic wave reflecting mirror housing 602, a top guide key 603, a bottom guide key 604, a top hemisphere support plate 605, a bottom hemisphere support plate 606, a center bottom hemisphere support plate 608, and a hollow cylindrical support frame 607. All these components are connected together and formed in a single molding process.

Referring to FIGS. 1, 6A, 6B and 6C, the ultrasonic wave reflecting mirror housing 602 is engraved into the surface of the hemisphere 601. It is used to house an ultrasonic wave reflecting mirror 50 (51) with convex or flat top surface shown in FIGS. 2A, 2B. The size of the reflecting mirror housing 602 is slightly smaller than that of the reflecting mirror 50 (51). This ensures that the reflecting mirror 50 (51) can be pressed into the mirror housing 602 and the mirror housing 602 can securely hold the mirror 50 (51) in its position without any movement during flow measurement. The depth of the reflecting mirror housing 602 is equal to or slightly smaller than the thickness of the reflecting mirror 50 (51), this will prevent particle deposition onto the surface of the reflecting mirror 50 (51). Particle deposition generally decreases the mirror reflectivity, and thus reduces signal strength. It negatively affects the measurement accuracy and reliability of an ultrasonic flow sensor.

Referring to FIGS. 6A, and 6C, guide keys 603 and 604 are formed on the top and the bottom of the hollow cylindrical support frame 607 respectively. The length of the guide key 604 is the same as that of the hollow cylindrical support frame 607 while the length of guide key 603 is smaller than that of the hollow cylindrical support frame 607.

Referring to FIGS. 1, 3A, 6A, and 6C, in the assembling process of an ultrasonic flow sensor of the present invention, the guide key 603 is coupled into the keyway 206 and the guide key 604 is coupled into the keyway 205 of the flow cell body 30. When the guide keys 603, 604 touched the bottom surfaces 215, 216 of the keyways 205, 206, the ultrasonic reflecting mirrors 50 and the reflecting mirror support fixture 60 is set to their measurement position.

Referring to FIGS. 6A, 6B and 6C, a top hemisphere support plate 605, a bottom hemisphere support plate 606, and a center hemisphere support plate 608 with a structure shown in FIG. 6B are formed to support the hemisphere 601. This structure also makes the reflecting mirror support fixtures 60 and 61 an effective flow straightener, which further helps making the flow inside the inner flow conduit 30 a fully developed one with a uniform velocity distribution profile. This in turn leads to the improved measurement accuracy and reliability of an ultrasonic flow sensor of the present invention.

Referring to FIGS. 1, 3A, taper-shaped transitions 209 and 210 are formed from the inner surface of the flow cell body 20 to the inner surface 31 of the inner flow conduit 30. These taper-shaped smooth transitions combined with the hemispheric reflecting mirror holders greatly improve the velocity distribution profile inside the inner flow conduit 30 and thus improve the overall measurement accuracy and reliability of an ultrasonic flow sensor of the present invention.

Figure 7:
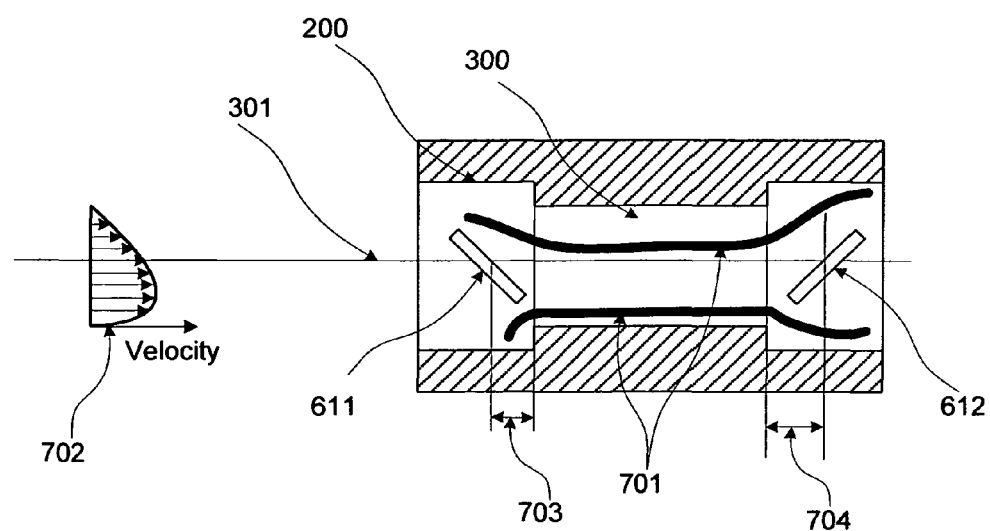
FIG. 7 illustrates a flow velocity distribution profile inside an inner flow conduit of prior art.

FIG. 7 shows the flow velocity distribution profile inside an inner flow conduit of prior art. In this arrangement, the reflecting mirror supporters 611, 612 are a flat plate, the distance, 703, between the reflecting mirror supporter 611 and the entrance of the inner flow conduit 300, and the distance, 704, between the reflecting mirror supporter 612 and the exit of the inner flow conduit 300 are not properly set, plus there is no smooth transition from the inner surface of the flow cell body 200 to the inner surface of the inner flow conduit 300. The flow velocity distribution profile inside the inner flow conduit 300 in this case is illustrated by line 701 and graphed in 702. It is clear from 702 that the flow velocity distribution is uneven and asymmetrical with respect to the center line 301 of the inner flow conduit 300. An ultrasonic flow sensor with such an arrangement has limited measurement accuracy and reliability.

Figure 8:
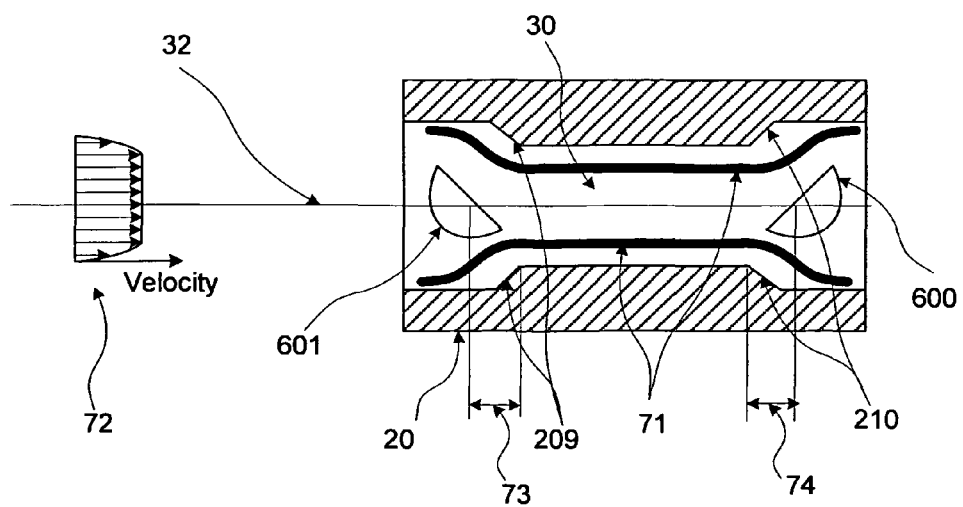
FIG. 8 illustrates a velocity distribution profile inside an inner flow conduit fixture of the present disclosure.

FIG. 8 shows the flow velocity distribution profile inside the inner flow conduit 30 of the present disclosure. In this arrangement, the reflecting mirror holders 600, 601 are hemispheres, the distance, 73, between the reflecting mirror holder 601 and the entrance of the inner flow conduit 30, and the distance, 74, between the reflecting mirror holder 600 and the exit of the inner flow conduit 30 are properly set to the optimal values. In addition there are tapered smooth transitions 209, 210 from the inner surface of the flow cell body 20 to the inner surface of the inner flow conduit 30. The flow velocity distribution profile inside the inner flow conduit 30 of this arrangement is illustrated by line 71 and graphed in 72. It is clear from 72 that the flow velocity distribution is uniform and symmetrical with respect to the center line 32 of the inner flow conduit 30. The measurement accuracy and reliability of an ultrasonic flow sensor 10 of the present disclosure are greatly improved compared with the prior art shown in FIG. 7.

Referring to FIGS. 1, 3A, the flow straightener housings 211, 212 are formed on the both sides of the flow cell body 20. They are used to hold the flow straighteners (not to shown here).

Figure 9:
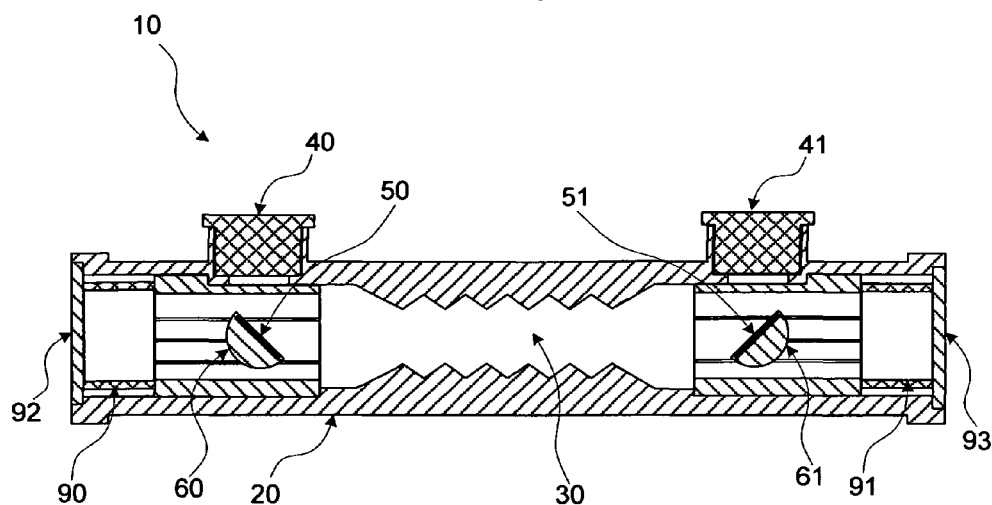
FIG. 9 illustrates the second embodiment of an ultrasonic flow sensor of the present disclosure.

FIG. 9 illustrates the second embodiment of an ultrasonic flow sensor of the present disclosure. Also referring to FIGS. 3A, 6A, 6C, the guide key 603 (shown in FIG. 6A) is coupled into the keyway 206 (shown in FIG. 3A) and the guide key 604 (shown in FIG. 6A) is coupled into the keyway 205 (shown in FIG. 3A) of the flow cell body 30. After the guide keys 603, 604 touched the bottom surfaces 215, 216 (shown in FIG. 3A) of the keyways 205, 206, a spacer 90 is placed behind the reflecting mirror support fixture 60, a flow straightener 92 is pressed into the flow straightener housing 211 (shown in FIG. 3A), it pushes against the spacer 90 and the reflecting mirror support fixture 60, locks the reflecting mirror support fixture 60 into its measurement position. In the same manner, after the guide keys 603, 604 touched the bottom surfaces 217, 218 of the keyways 207, 208 (shown in FIG. 3A), a spacer 91 is placed behind the reflecting mirror support fixture 61, a flow straightener 93 is pressed into the counter bore 212 (shown in FIG. 3A), it pushes against the spacer 91 and the reflecting mirror support fixture 61, locks the reflecting mirror support fixture 61 into its measurement position.

In this second embodiment of an ultrasonic flow sensor of the present disclosure, the threading holes 213, 214 (shown in FIG. 3A) are removed. This is because that there is no needs to use set screws to lock the reflecting mirror support fixtures 60, 61 into their measurement position.

Figure 10A:
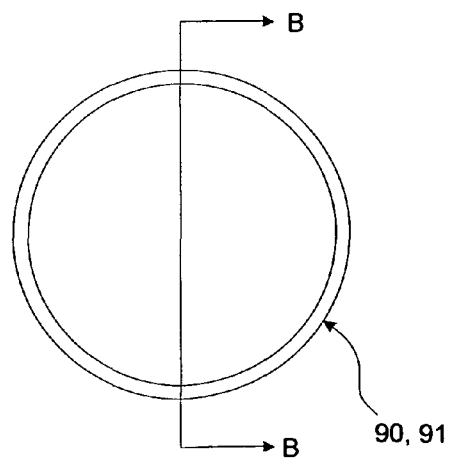
FIG. 10A shows a schematic front view of a spacer of the present disclosure.
Figure 10B:
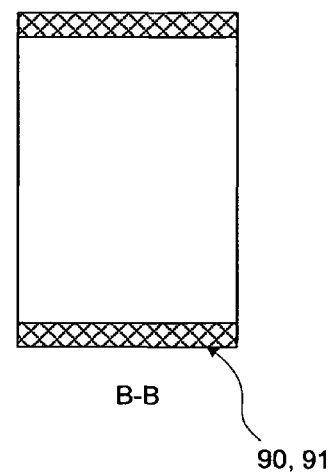
FIG. 10B shows a schematic cross-section view of a spacer of the present disclosure.

FIGS. 10A and 10B illustrate the detailed structure of the spacers 90 and 91. The spacers 90 and 91 are identical and made of the same material as the reflecting mirror support fixtures 60 and 61. They have a hollow cylindrical shape and their inner diameter is same as that of the reflecting mirror support fixtures 60 and 61. Their outer diameter is slightly smaller than the inner diameter of the flow cell body 20.

Figure 11A:
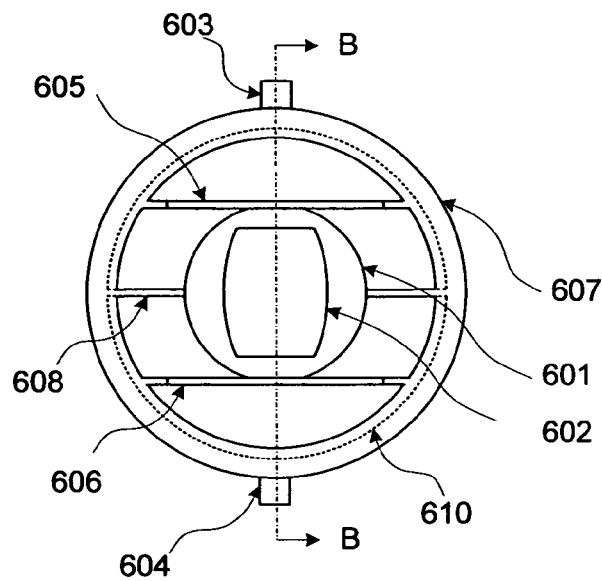
FIG. 11A shows a schematic front view of an ultrasonic wave reflecting mirror support fixture with a transition head of the present disclosure.
Figure 11B:
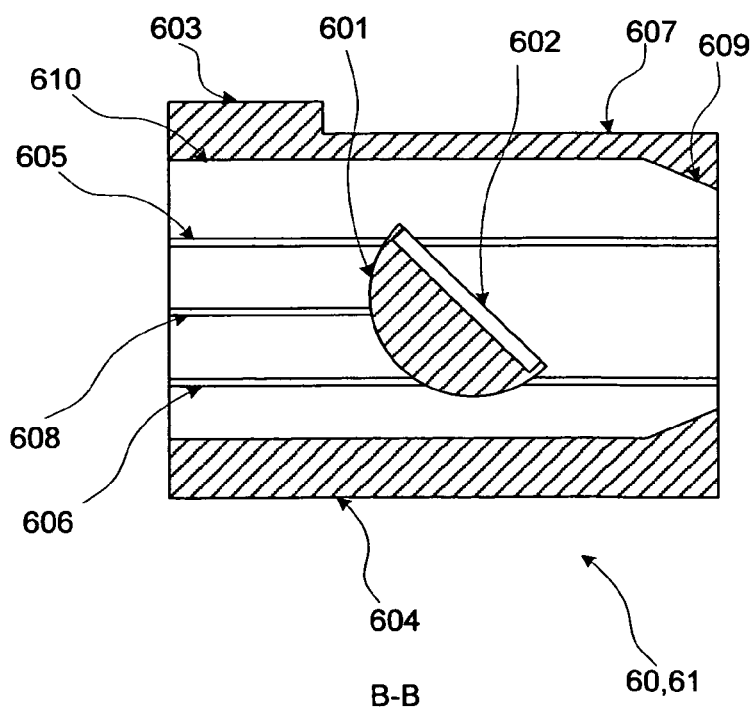
FIG. 11B shows a schematic cross-section view of an ultrasonic wave reflecting mirror support fixture with a transition head of the present disclosure.
Figure 12:
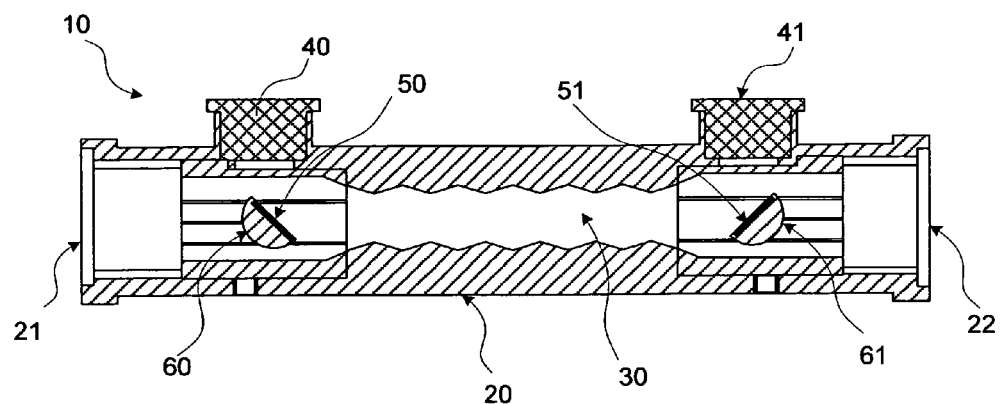
FIG. 12 illustrates the third embodiment of an ultrasonic flow sensor of the present disclosure.

FIGS. 11A, 11B and 12 illustrate the third embodiment of an ultrasonic flow sensor of the present disclosure. In this third embodiment, the taper-shaped smooth transition from the inner surface of the flow cell body to the inner surface of the inner flow conduit is formed by the reflecting mirror support fixture 60 (61) which has a cone-shaped head 609 shown in FIGS. 11A and 11B. Except the transition head 609, the other components of the reflecting mirror support fixtures 60, 61 are similar to those illustrated in FIGS. 6A, 6B and 6C. FIG. 12 shows a schematic cross-section view of an ultrasonic flow sensor using the reflecting mirror support fixtures 60, 61 with a transition head.

What is claimed is:

1. An ultrasonic flow sensor consists of:
   a flow cell body with an inlet on one side and an outlet on the other side through which the liquid or gaseous media flows,
   an inner flow conduit with rough surface which not only decreases the flow transition point from turbulence regime to laminar regime but also suppresses the parasitic multi-mode ultrasonic waves,
   one pair of electro-ultrasonic transducers for transmitting and receiving ultrasound signals,
   one pair of ultrasonic wave reflecting mirrors with flat or convex top surface for guiding the ultrasonic wave from one transducer to the other, and
   one pair of reflecting mirror support fixtures which align the reflecting mirrors to the center line of the inner flow conduit and also keeps the distance between the reflecting mirrors and the entrance/exit of the inner flow conduit in a range that the disturbance to the flow inside the inner flow conduit caused by the reflecting mirrors is minimized while the ultrasonic signal strength is maintained.

2. The ultrasonic flow sensor of claim 1, wherein the flow cell body is made of metallic materials.

3. The ultrasonic flow sensor of claim 2, wherein the flow cell body is made of bronze.

4. The ultrasonic flow sensor of claim 1, wherein the flow cell body is made of plastics.

5. The ultrasonic flow sensor of claim 1, wherein the inner flow conduit is an integrated portion of the flow cell body.

6. The ultrasonic flow sensor of claim 1, wherein the inner flow conduit is a separate module which is inserted into the flow cell body to form an inner flow conduit.

7. The ultrasonic flow sensor as in any one of claim 5 and 6 wherein the diameter of the inner flow conduit is smaller than that of the flow cell body.

8. The ultrasonic flow sensor as in any one of claim 5 and 6 wherein the inner flow conduit has a rough inner surface.

9. The ultrasonic flow sensor of claim 8, wherein the surface roughness varies from several microns to several millimeters depending on the ultrasonic wave length in the fluid and the diameter of the inner flow conduit used in the measurement.

10. The ultrasonic flow sensor of claim 5, wherein the transition from the inner surface of the flow cell body to the inner surface of the inner flow conduit is taper-shaped.

11. The ultrasonic flow sensor of claim 1, wherein the taper-shaped smooth transition from the inner surface of the flow cell body to the inner surface of the inner flow conduit is formed by inserting a cone-shaped metal or plastic ring.

12. The ultrasonic flow sensor of claim 1, wherein the taper-shaped smooth transition from the inner surface of the flow cell body to the inner surface of the inner flow conduit is formed by the reflecting mirror support fixture which has a cone-shaped head.

13. The ultrasonic flow sensor of claim 1, wherein the taper-shaped smooth transition from the inner surface of the flow cell body to the inner surface of the inner flow conduit is formed by mechanically machining the transition region of the flow cell body.

14. The ultrasonic flow sensor of claim 1, wherein the ultrasonic wave reflecting mirrors are made of stainless steel.

15. The ultrasonic flow sensor of claim 1, wherein the ultrasonic wave reflecting mirrors are made of plastics coated with thin metallic film layers.

16. The ultrasonic flow sensor of claim 1, wherein the ultrasonic wave reflecting mirror has a flat top surface.

17. The ultrasonic flow sensor of claim 1, wherein the ultrasonic wave reflecting mirror has a convex top surface which prevents particle deposition on the mirror surface and thus prevents the degradation of ultrasonic signal strength, as well as generate smaller disturbance to the flow inside the inner flow conduit compared with mirrors with concave top surface.

18. The ultrasonic flow sensor of claim 17, wherein the curvature of the ultrasonic wave reflecting mirror is small enough so that it does not cause significant ultrasound beam divergence.

19. The ultrasonic flow sensor of claim 17, wherein the ultrasonic wave reflecting mirror has a cylindrical-convex top surface.

20. The ultrasonic flow sensor of claim 17, wherein the ultrasonic wave reflecting mirror has a parabolic convex top surface.

21. The ultrasonic flow sensor of claim 1, the reflecting mirror support fixtures are made of plastics.

22. The ultrasonic flow sensor of claim 1, the mirror holders of the reflecting mirror support fixtures are hemispheres or hemi-elliptical spheres.

23. The ultrasonic flow sensor of claim 1, wherein the reflecting mirror support fixtures are detachable from the flow cell body.

24. The ultrasonic flow sensor of claim 1, wherein the reflecting mirror support fixtures have guide keys aligned into the corresponding keyways in the flow cell body to make the reflecting mirrors are properly aligned to the center line of the inner flow conduit as well as to keep the distance between the reflecting mirrors and the entrance/exit of the inner flow conduit within a desired range, which assures that the disturbance to the flow inside the inner flow conduit caused by the reflecting mirrors is minimized while the ultrasonic signal strength is maintained.

25. The ultrasonic flow sensor of claim 1, wherein the reflecting mirror support fixtures have several parallel plates which are formed with unique structure and evenly placed to support the hemisphere reflecting mirror holder and also act as flow straighteners, diverting the fluid before entering the inner flow conduit, making the flow velocity distribution profile inside the inner flow conduit more uniform.

* * * * *